(12) United States Patent
Jung et al.

(10) Patent No.: US 6,881,467 B2
(45) Date of Patent: Apr. 19, 2005

(54) VACUUM INSULATOR USING GLASS WHITE WOOL AND ITS FABRICATION METHOD

(75) Inventors: Hyung-Jin Jung, Seoul (KR); Goo-Dae Kim, Seoul (KR); No-Kyung Park, Seoul (KR); Yong-Gyu Shin, Suwon (KR); Sung-Ho Yoon, Seoul (KR); Sung-Kyu Lee, Seoul (KR)

(73) Assignee: Korea Institute of Science and Technology (KR)

( * ) Notice: Subject to any disclaimer, the term of this patent is extended or adjusted under 35 U.S.C. 154(b) by 364 days.

(21) Appl. No.: 10/030,528

(22) PCT Filed: Mar. 16, 2001

(86) PCT No.: PCT/KR01/00421

§ 371 (c)(1),
(2), (4) Date: Apr. 4, 2002

(87) PCT Pub. No.: WO01/85445

PCT Pub. Date: Nov. 15, 2001

(65) Prior Publication Data

US 2002/0167105 A1 Nov. 14, 2002

(30) Foreign Application Priority Data

May 12, 2000 (KR) ......................................... 2000/25307

(51) Int. Cl.$^7$ .............................. B32B 1/04; B32B 3/02
(52) U.S. Cl. ........................... 428/69; 428/76; 264/101; 264/102; 264/109; 264/120
(58) Field of Search ..................... 428/69, 76; 264/101, 264/102, 109, 120

(56) References Cited

U.S. PATENT DOCUMENTS

| | | | |
|---|---|---|---|
| 4,195,395 A | 4/1980 | Silver et al. | |
| 4,425,413 A | 1/1984 | Ziegenbein et al. | |
| 4,668,555 A | 5/1987 | Uekado et al. | |
| 4,681,788 A | 7/1987 | Barito et al. | |
| 5,090,981 A | 2/1992 | Rusek, Jr. | |
| 5,094,899 A | 3/1992 | Rusek, Jr. | |
| 5,330,816 A | 7/1994 | Rusek, Jr. | |
| 6,436,505 B1 * | 8/2002 | Kuroda et al. | ................. 428/69 |

FOREIGN PATENT DOCUMENTS

| | | |
|---|---|---|
| JP | 58-106292 | 6/1983 |
| JP | 07-280170 | 10/1995 |
| JP | 10-061875 | 3/1998 |
| JP | 10-064488 | 3/1998 |
| JP | 11-280987 | 10/1999 |
| JP | 2000-035193 | 2/2000 |
| KR | 1019970042610 | 7/1997 |
| KR | 1999010954 | 2/1999 |

OTHER PUBLICATIONS

Korean Patent Abstract for Publication No. 1019970042610, Publication Date Jul. 24, 1997.
Korean Patent Abstract for Application No. 1019970033855, Application Date Jul. 19, 1997.
Japanese Office Action dated Jun. 1, 2004 issued in related Japanese Application No. 2001-582079.

* cited by examiner

Primary Examiner—Stephen J. Lechert, Jr.
(74) Attorney, Agent, or Firm—Ostrolenk, Faber, Gerb & Soffen, LLP

(57) ABSTRACT

The vacuum insulator in accordance with the present invention comprises glass white wool body which density is 0.1~0.5 g/cm$^3$ in density and is below 0.0023 kcal/mh° C. in thermal conductivity, and a non permeable container surrounding the body in which the pressure is between $10^{-6}$ ~$10^{-1}$ torr. The vacuum insulator is fabricated by piling up glass white wool, thermal-pressutizing the piled glass white wool to form a body of 0.1~0.5 g/cm$^3$ in density wherein the pressurizing is done at 0.007~1.5 kg/cm$^2$ and under 20° C. for more than 10 minutes, putting the body in the non-permeable container, and producing a vacuum in the container.

9 Claims, 3 Drawing Sheets

VACUUM INSULATOR USING GLASS WHITE WOOL AND ITS FABRICATION METHOD

This application is a 371 of PCT/KR01/00421 filed Mar. 16, 2001.

TECHNICAL FIELD

The present invention relates to a vacuum insulator which can be used as for an insulating and thermal insulating refrigerating/freezing, transportation means, and various industrial equipment, And particularly, to a vacuum insulator using glass white wool and its fabrication method which is pressure forming the glass white wool including no organic, or inorganic binder and air evacuating the white glass wool inside a resistant for. permeable container.

BACKGROUND ART

Conventionally, a polyurethane foam which is foamed using HGFC such as Freon was mainly used for an insulator, however, a new heat insulating system is required recently because a heat insulating function is reduced by deterioration when it is used for a long time and using of the HCFC is restricted because of environmental problems. In addition, a vacuum heat insulating system is searched in order to improve insulating characteristics of products such as a refrigerator or a freezer.

The vacuum insulating system is a system for minimizing heat transfer and maintaining heat insulation by maintaining inside the system to be vacuum. In order to maintain the vacuum as a panel state, important elements are strength and air pore state of a main body, and heat insulating function by which the atmosphere pressure can be endured.

The main body used in the vacuum heat insulating system can be made using inorganic materials such as silica powder, fiberglass, molded body of calcium silicate, and using organic materials such as polyurethane and polystyrene foam of fine open cell structure.

Methods of using the silica powder as the main body of the vacuum insulator are disclosed in U.S. Pat. Nos. 4,195, 395, 4,425,413, and 4,681,788, a method using the polyurethane foam of open cell structure is disclosed in U.S. Pat. No. 4,668,555, and a method of using the polystyrene foam is disclosed in Korean Patent Application No. 95-48619. In addition, there is disclosed a method of increasing insulation function by changing the air pore structure of the polystyrene and polyurethane foam into an anisotropic structure in Korean Patent Laid-open No.1999-010954. The heat insulating performance of the vacuum insulator made by the insulating main body like above is 0.004~0.007 Kcal/mh° C. which is better than 0.02 Kcal/mh° C. of the polyurethane foam in conventional refrigerator, however, it has lower performance than 0.002~0.003 Kcal/mh° C. of the vacuum insulator made using the fiberglass.

The vacuum insulator using the fiberglass is disclosed in U.S. Pat. Nos. 5,090,981, 5,094,899, and 5,330,816.

According to the above US patents, the fiberglass should be molded as a certain form in order to be used as the vacuum insulator, and therefore methods of using small amount of organic or inorganic binder, or compression heat hardening the fiberglass not including the binder are used. In case of using organic or inorganic binder, the binder may occupy the air pore layer of the fiberglass, or the deterioration is generated, whereby the vacuum insulating effect is reduced and producing cost can be increased because of increasing processes and materials. According to the method of heat hardening, the fiberglass is compressed in a temperature range of higher than strain point and lower than softening point of the glass constituting the fiber glass, and equilibrium time is maintained, whereby a fiberglass board is made. However, according to this method, the fiberglass should be heated to the temperature higher than the strain point of the glass constituting the fiberglass, and sealing should be made in a vacuum chamber when vacuum air evacuating, and therefore many processes and energy are required and producing cost is increased.

DETAILED DESCRIPTION OF THE INVENTION

Therefore, it is an object of the present invention to provide a vacuum insulator by which production cost and processes can be reduced while maintaining same insulating performance as that of the conventional art using the conventional fiberglass, and therefore productivity is increased.

To achieve the object of the present invention, there is provided a vacuum insulator using glass white wool comprising a glass white wool body which is 0.1~0.5 g/cm$^3$ in density and is below 0.0023 Kcal/mh° C. in thermal conductivity and a non permeable container surrounding the body in which vacuum pressure is $10^{-6}$~$10^{-1}$ torr.

Also, the vacuum insulator is fabricated by piling up glass white wool including no organic or inorganic binder, thermal-pressurizing the piled glass white wool to form a body of 0.1~0.5 g/cm$^3$ in density wherein the pressurizing is done at 0.007~1.5 kg/cm$^3$ and under 20° above the strain point of the glass white wool for more than 10 minutes, putting the body in the non permeable container and producing a vacuum in the container.

BRIEF DESCRIPTION OF THE DRAWINGS

FIG. 1a is showing a process of piling the glass white wool on a lower pressing plate of a press, FIG. 1b is showing a process of pressing the piled glass white wool, and FIG. 1d is showing a process of vacuum evacuating the glass white wool body in a non permeable container;

MODE FOR CARRYING OUT THE PREFERRED EMBODIMENTS

The present invention will now be described with reference to accompanying drawings.

Inventors of the present invention paid attention to a fact that a diameter of glass of white wool state including no binder is 10 μm or smaller than that, and found that the glass can be distorted by pressurizing in lower temperature than strain point of fiberglass having same constitution as the glass.

Figure 1A:
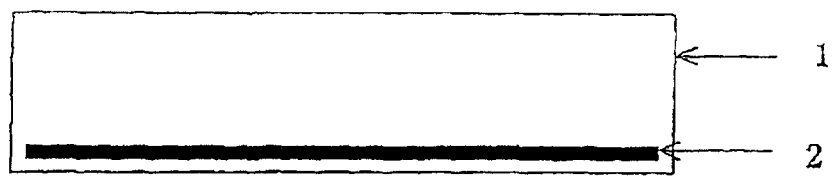
FIG. 1a through 1d are process charts showing processes of fabricating a vacuum insulator using glass white wool.
Figure 1A:
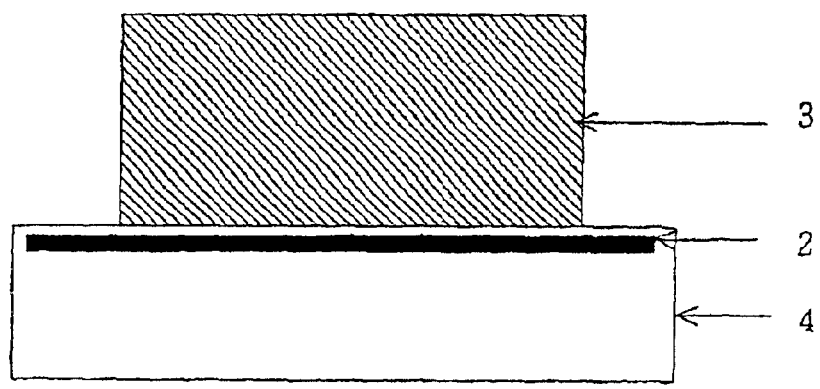
Figure 1B:
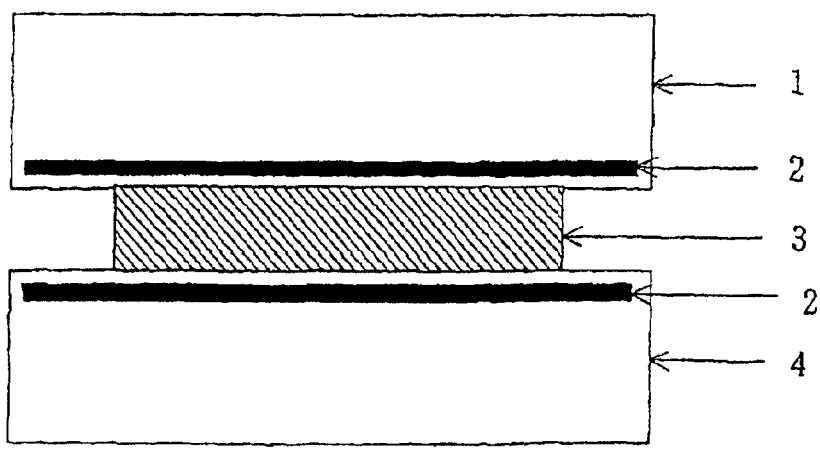
Figure 1B:
Figure 1C:
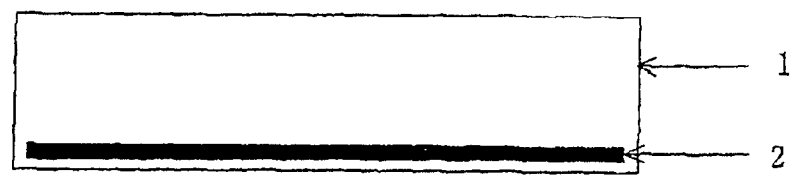
Figure 1C:
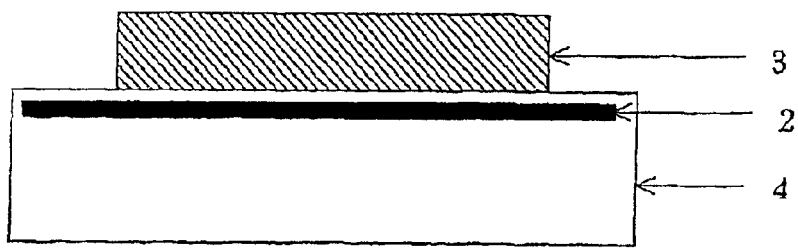
Figure 1C:
Figure 1D:
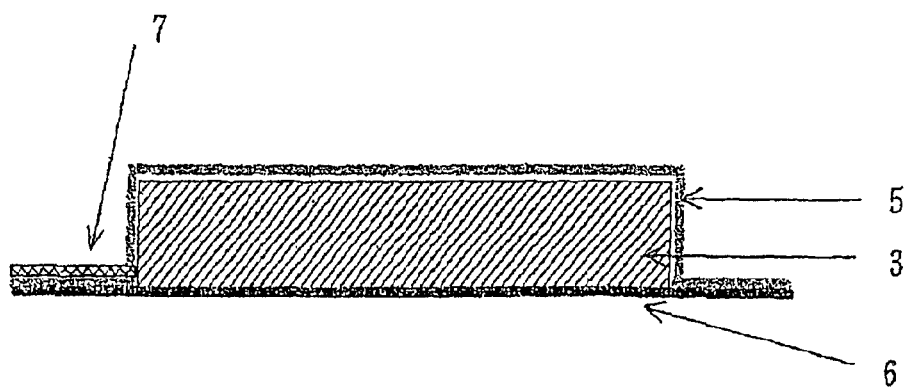
Figure 2:
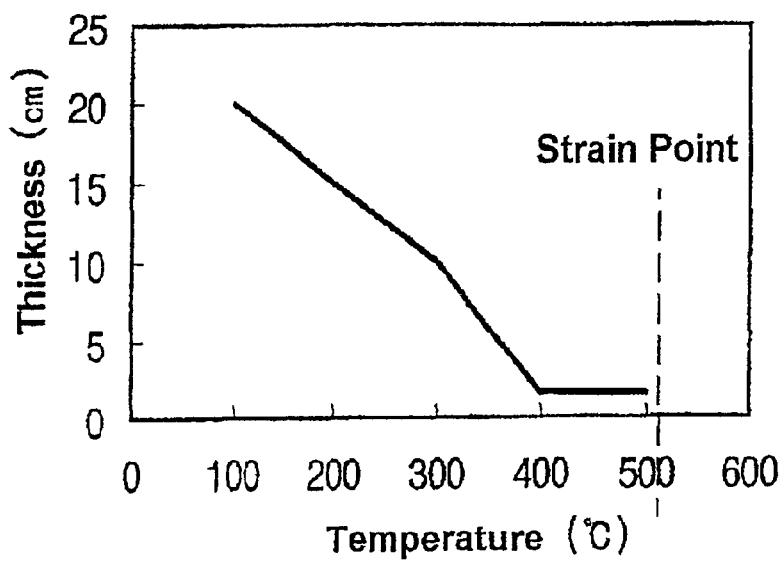
FIG. 2 is a graph showing thickness change of the piled glass white wool while maintaining the glass white woll body when the piled glass white wool is pressed for 30 minutes under pressure of 0.007 kg/cm$^2$.

The fabricating method of the vacuum insulator according to the present invention will be described as follows with reference to Figures. FIG. 1a through 1d are process charts showing processes of fabricating the vacuum insulator using the glass white wool according to the present invention. Referring to Figures, temperature is maintained to be under 20° C. above the strain point of the glass white wool by heating a heating unit 2 on an upper pressing plate 1 and on a lower pressing plate 4. And then, glass white wool 3a of a certain shape including no organic or inorganic binder is piled on the lower pressing plate 4 (FIG. 1). The piled glass white wool 3a is pressed by lifting up the lower pressing plate 4 (FIG. 2). At that time, pressing temperature, pressing time, and molding pressure are important, and appropriate range will be described later. When the molding is completed, the lower pressing plate 4 is lowered and the glass white wool body 3b is cooled down out of the press(FIG. 1c). After that, the glass white wool 3b is put into a non permeable container made using stainless steel thin plates 5 and 6, and decompressed by vacuum evacuating (FIG. 1d) in order to improve the heat insulating function of the glass white wool body 3d. The non permeable container is made using stainless steel thin plate having thickness smaller than 120 μm. Through the above depressing processes, the inner structure of the glass white wool body 3d is changed into a structure having greater heat insulating function. Before the glass white wool body is put into the container, it may be cut its edges or fabricated to be appropriate size. In order to evacuate, a small pipe 7 is connected to one side of the non permeable container and evacuation is made through the pipe 7, and therefore the glass white wool body 3d inside the container becomes vacuum state. After that, the container is sealed by pressing the pipe 7. It Is desirable that the pressure of the non permeable container is between $10^{-6} \sim 10^{-1}$ torr, and the pipe is pressed by a certain amount of load.

The thickness of the glass white wool is searched while changing the pressing temperature and the pressing time under a certain pressure, in order to set an optimum ranges of temperature and time.

FIG. 2 is showing thickness change of the glass white wool body when the piled glass white wool is pressed for 30 minutes under pressure of 0.007 kg/cm³ as maintaining the body. As shown in FIG. 2, the thickness for maintaining the body can be made if the temperature does not reach to a certain level under a certain pressure. In that case, it can be used as the main body of the vacuum insulator. The temperature by which the thickness as the body can be maintained should be 400° C. or more which is 110° C. below the strain point of the glass white wool. Therefore, the lowest molding temperature should be larger than the temperature Of 110° C. below the strain point. However, it is desirable that the highest molding temperature is under 20° C. above the strain point in consideration of distortionn of the glass white wool.

Figure 3:
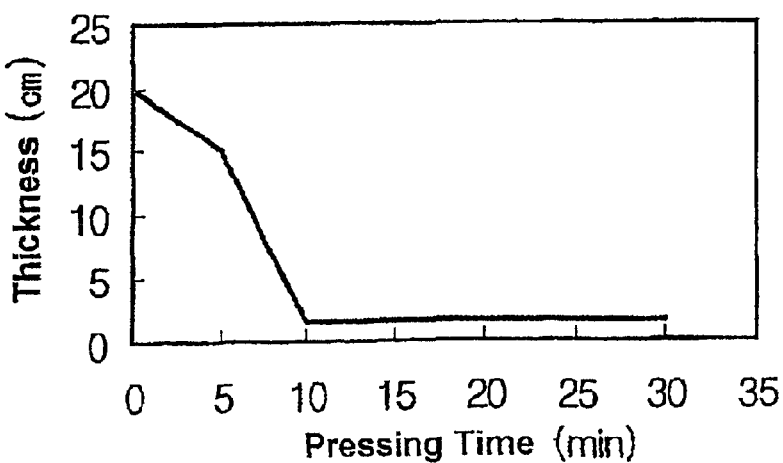
FIG. 3 is a graph showing change of time by which the thickness of the body can be maintained when the piled glass white wool is pressed under pressure of 0.007 kg/cm$^3$ and 400° C. temperature.

FIG. 3 is a graph showing change of time of maintaining the thickness as a molded body when the piled glass white wool is pressed in 400° C. temperature and 0.007 kg/cm³ pressure. The thickness as the molded body is not made if it is heated for less than 10 minutes, then the molded body is expanded again and it is not suitable to be the main body. Therefore, the pressing time should be more than 10 minutes.

Referring to the above results the molding condition for maintaining the glass white wool is that the temperature should be higher than 400° C. which is about 110° C. below the strain point of the glass constituting the glass white wool, the pressure is between 0.007~1.5 kg/cm², and that the glass white wool should be pressed more than 10 minutes. If the pressure is larger than the above lowest pressure, the molding by pressing can be made. And if the molding pressure is larger than the above highest pressure, the fiber in the glass white wool is excessively broken, and therefore it can be used as the main body of the vacuum insulator and the insulating performance may be reduced even if the thickness is maintained.

The thermal conductivity of the vacuum insulator fabricated according to the present invention is about 0.002 kcal/mh° C., and it is superior to those of the vacuum insulator using the organic or inorganic materials, and calcium silicate body.

The present invention will be described in more detail with reference to embodiments of the present invention, however the present invention is not limited to the embodiments, and various changes and modifications can be made.

EMBODIMENT 1

Glass white wool of about 8~12 μm diameters in average including no organic or inorganic binder is used. Borosilicate including $B_2O_3$ about 4~5 wt % is included in the glass white wool, the strain point of the glass white wool is 510° C., and an annealing point of the glass white wool is 550° C. The above glass white wool of 200 g which is cut the width and length to be 20~30 cm is piled on the lower pressing plate of the press. Temperature of the heating unit on the upper and lower pressing plates is maintained to be about 400° C. which is 100° C. below the strain point. This temperature is the lowest temperature at which the glass white wool body can be maintained. The glass white wool is pressed so that the thickness is to be 2 cm by lifting up the lower pressing plate with 450 kg load, and is maintained for 30 minutes. After that, the glass white wool is cooled down out of the press by lowering the lower pressing plate. The molded body is fabricated so that the width and the length are respectively to be 20 cm, is put into a non permeable container made using stainless steel thin plate of 80 μm, thickness, and is evacuated to be $5.6 \times 10^{-5}$ torr through the pipe 7 disposed on side surface of the container. After that, the pipe is pressed and adhered by load of 250 kg, and whereby a vacuum insulating panel is fabricated. The thermal conductivity of the vacuum insulating panel measured with the thermal conductivity detector(model Rapid-k, DYNATECH R/D Co.) in the temperature of 20° C. in average is 0.0023 kcal/mh° C.

EMBODIMENT 2

A vacuum insulating panel is fabricated by the same method as in Embodiment 1, except that the pressing load is 200 kg when the glass white wool is molded.

EMBODIMENT 3

A vacuum insulating panel is fabricated by the same method as in Embodiment 1, except that the pressing load is 300 kg when the glass white wool is molded.

Thermal conductivity of the vacuum insulators using glass white wool fabricated in Embodiments 1 through 3 are shown in following table 1.

TABLE 1 thermal conductivity of the vacuum insulating panels according to the present invention.

| embodiment | Thermal conductivity (kcal/mh° C.) | Pressure (torr) |
|---|---|---|
| 1 | 0.0023 | $5.6 \times 10^{-5}$ |
| 2 | 0.0022 | $5.6 \times 10^{-5}$ |
| 3 | 0.0022 | $5.6 \times 10^{-5}$ |

INDUSTRIAL APPLICABILITY

As so far described, the vacuum insulating panel using glass white wool and fabricating method according to the present invention has higher heat insulating function than that of conventional vacuum insulating panel using organic materials, in organic material powder, and calcium silicate body, and the high production cost which is a disadvantage of the conventional vacuum insulating panel using fiberglass as the main body can be reduced, whereby the productivity can be greatly imcreased.

What is claimed is:

1. A vacuum insulator using glass white wool comprising:
   a glass white wool molded body which is 0.1~0.5 g/cm$^3$ in density, and is below 0.0023 kcal/mh° C. in thermal conductivity; and
   a non permeable container surrounding the molded body in which pressure is between $10^{-6}$~$10^{-1}$ torr.

2. A fabrication method of the vacuum insulator using glass white wool comprising the steps of:
   piling glass white wool including no organic or inorganic binder to be a certain shape;
   molding the piled glass white wool by heating and pressing it in a temperature under 20° C. above strain point of the glass white wool, under pressure between 0.007~1.5 kg/cm$^2$, for more than 10 minutes; and
   decompressing the molded glass white wool by putting it into the non permeable container and evacuating.

3. The method of claim 2, wherein the lowest molding temperature is higher than a temperature which is 110° C. below the strain point of the glass white wool in the step of molding the glass white wool.

4. The method of claim 2, wherein a density of the molded glass white wool is between 0.1~0.5 g/cm$^3$.

5. The method of claim 2 further comprising a step of fabricating edges of the glass white wool body before putting the body into the non permeable container.

6. The method of claim 2, wherein the non permeable containers made using stainless steel thin plate having thickness less than 120 $\mu$m.

7. The method of claim 2, wherein a pipe for evacuating is disposed on one side surface of the non permeable container.

8. The method of claim 7 further comprising a step of sealing the pipe by pressing after the step of evacuating the glass white wool in the non permeable container.

9. The method of claim 2, wherein the pressure is to be between $10^{-6}$~$10^{-1}$ torr in the step of evacuating the glass white wool in the non permeable container.

* * * * *